July 2, 1963  R. M. ROOD ET AL  3,095,951
ARTICLE AND METHOD FOR JOINING DISSIMILAR MATERIALS
Filed Jan. 11, 1960

Inventors,
Robert M. Rood,
Philippe Villers,
by Gilbert P. Tarleton
Their Attorney.

United States Patent Office 3,095,951
Patented July 2, 1963

3,095,951
ARTICLE AND METHOD FOR JOINING
DISSIMILAR MATERIALS
Robert M. Rood, Pittsfield, Mass., and Philippe Villers,
Bellows Falls, Vt., assignors to General Electric Company, a corporation of New York
Filed Jan. 11, 1960, Ser. No. 1,682
4 Claims. (Cl. 189—36)

This invention relates to the joining of dissimilar materials, and more particularly to an improved process and washer for joining such materials by welding.

The nature of many materials is such that they cannot be fused or welded to each other, yet it is often desirable to secure such dissimilar materials together. For example, one instance in which it may be desirable to join one dissimilar material to another would be on the inside of a tank surrounding an electrical apparatus, such as a transformer that produces a magnetic field in the space around it. In such a situation, it is desirable for a steel tank surrounding such apparatus to be lined with an aluminum plate so that the steel will be shielded from the stray magnetic field, and thus hot spots will not be caused in the steel by eddy currents generated by the magnetic field.

When one of the dissimilar materials is an easily weldable metal, such as steel, it can be joined to an incompatible material, such as aluminum, copper, magnesium, ceramic, etc., by a procedure known in the art as plug welding. The important principles of plug welding are as follows. A pair of plate members made from dissimilar materials, such as aluminum and steel, respectively, are placed in face to face contact. A hole has been previously made in the aluminum, or other incompatible material. A washer made from substantially the same type of metal as in the easily weldable plate member is placed on the incompatible member on the side thereof opposite the weldable plate member. The aperture in the washer is coaxial with the aperture in the incompatible member. Then, a welding tool, such as a Linde Sigma Arc Spot Welder, is placed over the washer, and a consumable wire electrode is passed through the apertures in the washer and the incompatible member into contact with the weldable member. The welding tool is filled with carbon dioxide or an inert gas, and thus a controlled atmosphere surrounds the above-mentioned apertures. Voltage is applied to the tool, and an arc is created which causes the wire electrode, washer, and a portion of the weldable plate to melt and fuse together to form a weld plug that fills the aperture. The incompatible member is thus held in place by mechanical contact with the washer and the weldable member. A well-known arrangement of conventional apparatus for carrying out the above described process is illustrated in FIGURE 27.2 of the Welding Handbook (4th edition, 1958), published by the American Welding Society, it being understood that such apparatus forms no part of the invention disclosed hereinafter.

The above-mentioned plug welding procedure has been found to have several disadvantages. For example, it is difficult to center the washer over the aperture in the incompatible member after the welding tool has been applied around the washer; this results in unsatisfactory welds if the washer and tool are too far off center. Also, and by far more important, it has been found that the peripheral edge of the incompatible plate member in the area adjacent the aperture will melt when the welding arc is applied, thus causing the incompatible material to flow into the weld and contaminate the joint. This causes a weakening of the weld and also results in corrosion problems. It is believed that the peripheral edges of the incompatible member melt because the arc heat is not dissipated as rapidly there as it is in the surface of the aperture. This problem is particularly acute where the incompatible material is aluminum. This invention eliminates the defects mentioned above by shielding the peripheral edge with a solid fusible barrier that also centers the washer.

Accordingly, it is an object of this invention to provide a method of joining dissimilar materials by plug welding in which the weld is not contaminated by the melting of incompatible material.

It is another object of this invention to provide an improved washer for plug welding of dissimilar materials.

Another object of this invention is to provide a washer to be used in plug welding dissimilar materials, in which the washer shields the peripheral edges of the incompatible material and also centers itself around an aperture in such material.

According to one aspect of our invention, we provide an improved method of joining dissimilar materials by plug welding in which an aperture is provided in the incompatible material. A washer is placed over this aperture, and the peripheral edges of the aperture are shielded by means of a solid fusible barrier. Another aspect of our invention is the provision of an extension or neck on a washer to be used for plug welding dissimilar materials, the extension or neck serving the purpose of shielding the peripheral edge of an aperture in the incompatible material and also centering the washer in the aperture.

While the specification includes claims particularly pointing out and distinctly claiming the subject matter which we regard as our invention, it is believed that the invention will be better understood from the following description taken in connection with the accompanying drawings.

Figure 1:
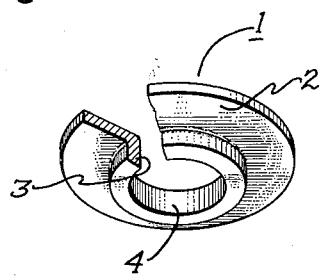
FIGURE 1 is a perspective, partially cross-sectional, view of an improved plug welding washer according to my invention.

Referring now to FIGURE 1, therein is illustrated the improved plug weld washer 1 of our invention. The washer 1 comprises an annular main body portion 2 and an extension or neck portion 3 that is integral with the main body portion 2. The neck portion 3 extends beyond the body portion 2 in a plane substantially perpendicular to the plane of the body portion. A hole 4 extends completely through the neck portion 3. The improved method of joining dissimilar materials by plug welding according to our invention may employ a washer embodying the features described above.

Figure 2:
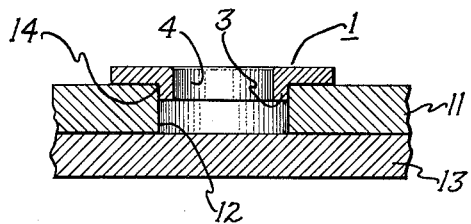
FIGURES 2–4 are cross-sectional views of the washer of FIGURE 1 being used in our improved plug welding process.

Referring now to FIGURE 2, the first step in our improved plug welding method is illustrated therein. A first joint member 11 made of a material, such as aluminum, magnesium, copper, ceramic, or any other material incompatible from a welding standpoint to an easily weldable material, such as steel, has first been provided with an aperture 12. The aperture 12 may be provided by any suitable method such as punching, or drilling. A second joint member 13 made from an easily weldable material, such as steel, is placed in face to face contact with the first joint member 11 on one side thereof. Then, the peripheral edge 14 of the aperture 12 is shielded from the welding arc by a solid fusible barrier. This may be accomplished by using a washer 1 made in accordance with our invention. The washer 1 is placed in contact with the opposite side of the first joint member 11 around the periphery of the aperture 12, and the neck portion 3 of the washer 1 is extended into the aperture 12 to shield the edge 14. The washer 1 is made from a weldable material that is compatible with the material from which the second joint member 13 is made and is thus fusible therewith. The washer 1 centers itself in the aperture 12 and is prevented from movement by the neck 3 extending into the aperture 12.

Figure 3:
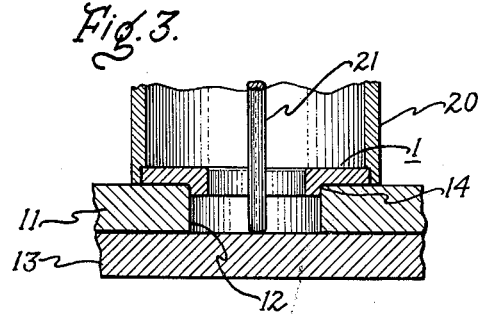

Referring now to FIGURE 3, an arc welding tool 20, such as a Linde Sigma Arc Spot Welder, has the nozzle thereof placed over the washer 1 and around the aperture 12. A wire 21 of consumable electrode material compatible from a welding standpoint with the washer 1 and second joint member 13 is passed through the hole 4 in the washer and aperture 12 into contact with the second joint member 13. A suitable gas, such as $CO_2$ or one of the inert gases, may be passed through the tool 20 around the area to be welded according to the conventional practice known as gas shielded metal-arc welding. It is thus apparent that the term shield, as used in the preceding paragraphs, referred to a welding arc shield for an aperture, and not to a gas atmosphere shield, as used in conventional gas shielded metal-arc welding. Next, current is applied to the apparatus in the conventional manner, and an arc is formed for melting the electrode 21, washer 1, and a portion of the second joint member 13. The materials fuse together and form a plug weld, as shown in FIGURE 4.

Figure 4:
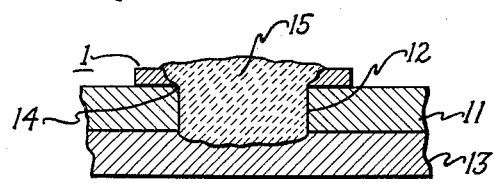

It should also be noted in FIGURE 4 that no portion of the first joint member 11 has melted, and thus the weld bead 15 has not been contaminated with the incompatible material from which the member 11 is made. The first joint member 11 is fastened to the second joint member 13 by means of mechanical contact with the washer 1 around the aperture 12 and mechanical contact of the members 11 and 13.

An example of a commercial application of our invention is described below, it being understood that the scope of the invention is not to be limited by the details of the process or washer structure hereinafter described. An aluminum plate ¼ inch thick was plug welded to a mild steel plate ½ inch thick to form a shield on the inside of a transformer enclosure tank. A ½ inch aperture was punched in the aluminum plate; a mild steel washer 1 inch in diameter, approximately ⅛ inch thick, and having a neck about 1/16 inch in length was placed on the aluminum plate with the neck extending into the aperture and shielding the peripheral edge thereof. The nozzle of a Linde Sigma Arc Spot Welder was centered over the washer, and a 1/16 inch diameter, mild steel, consumable wire electrode was passed from the nozzle, through the washer and aperture, into contact with the steel plate. The nozzle was filled with $CO_2$ gas according to conventional practice. A current of about 350 amperes, D.C., reverse polarity at a voltage of 32 volts was applied for 4 seconds. The rate of electrode wire feed was approximately 250 inches per minute. The resulting plug welds were strong and free from contamination because the aluminum did not melt and mix with the steel.

Figure 5:
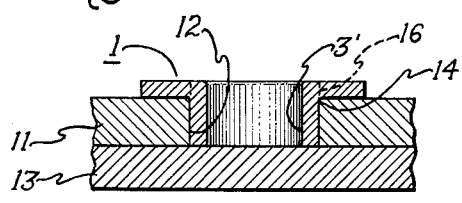
FIGURE 5 is a cross-sectional view showing a modification of the washer of FIGURE 1.

FIGURE 5 illustrates a modification of our improved washer of FIGURE 1. In this modification the neck portion 3' extends the entire length of the aperture 12 and comes into contact with the second joint member 13. It is often desirable to extend the neck portion 3' when plug welding an incompatible material which has a relatively low melting point or which does not transmit heat easily because portions of the incompatible material other than at the peripheral edges thereof around the aperture are likely to melt. It will be obvious to one skilled in the art that a more expensive, and hence less desirable, alternative way making the washer of FIGURE 5 would be to employ a separate, unattached cylinder (indicated in dotted lines at 16) in place of the neck 3'. The use of such a cylinder also provides an alternative structure for practicing our improved method.

Figure 6:
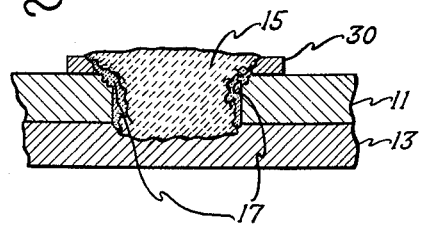
FIGURE 6 is a cross-sectional view showing a plug weld made with a washer according to the prior art.

Referring now to FIGURE 6, the plug weld obtainable with a washer made in accordance with the prior art is illustrated. The prior art washer 30 was a common circular washer with no neck portion extending out of the plane of its annular body portion. It will be seen that the peripheral edges of the incompatible material 11 have been melted away because they were not shielded from the heat of the arc. This incompatible material has flowed into the plug and contaminated the weld at 17. Consequently, the weld has been mechanically weakened, and corrosion problems are also likely to result.

It has thus been shown that by using the improved washer according to our invention in the process described above, the advantages inherent in joining dissimilar materials by the plug welding process are obtained without the disadvantages previously encountered. In particular, our improved washer and process eliminate the difficulty in centering the washer and welding tool over the aperture in the incompatible material. Furthermore, our improved process provides a fusible barrier as a shield for the peripheral edges of the incompatible material, thus preventing the melting of that material and the flowing of such material into the weld with a consequent contamination of the plug.

It will be understood, of course, that while the form of the invention illustrated and described herein constitutes the preferred embodiment of the invention, and it is not intended herein to illustrate or describe all of the possible equivalent forms or ramifications thereof. It will also be understood that the words used are words of description rather than words of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. The method of plug welding dissimilar materials comprising the steps of:
   (1) providing an aperture in a first member made from one of said materials,
      (1') said first member defining a peripheral edge around said aperture,
   (2) placing a second member made from an easily weldable material in contact with said first member adjacent said aperture on the side opposite said peripheral edge,
      (2') said first and easily weldable materials being incompatable from the welding standpoint,
   (3) placing a washer made from a material compatible from the welding standpoint with said easily weldable material around the aperture in said first member on the side opposite said second member,
   (4) shielding said peripheral edge by extending an integral portion of said washer into said aperture beyond said peripheral edge,
   (5) providing a hole in said integral portion of said washer,
      (5') said hole extending completely through said washer,
   (6) inserting a compatible non-integral consumable electrode through said aperture and hole into contact with said second member,
   (7) discharging a welding arc from said electrode,
   (8) feeding said electrode through said hole while discharging said arc until
      (8') said integral portion is substantially consumed, and
      (8") said electrode and washer are fused into a plug weld filling said aperture and united to said second member, whereby the shielding of said peripheral edge by said integral portion prevents contamination of said weld caused by melting of said one material.

2. The method of plug welding dissimilar materials comprising the steps of:

(1) providing an aperture in a first member made from one of said materials,
   (1') said first member defining a peripheral edge around said aperture,
(2) placing a second member made from a second material in contact with said first member adjacent said aperture on the side opposite said peripheral edge,
   (2') said first and second materials being incompatible from the welding standpoint,
(3) placing a washer made from a material compatible from the welding standpoint with said second material around the aperture in said first member on the side opposite said second member,
(4) extending a shield of compatible material into said aperture beyond said peripheral edge,
(5) providing a hole in said shield,
   (5') said hole extending completely through said shield,
(6) inserting a compatible non-integral consumable electrode through said aperture and hole into contact with said second member,
(7) discharging a welding arc from said electrode,
(8) feeding said electrode through said hole while discharging said arc until
   (8') said shield is substantially consumed, and
   (8") said electrode, washer, and shield are fused into a plug weld filling said aperture and united to said second member, whereby the extending of said shield beyond said peripheral edge prevents contamination of said weld caused by melting of said one material.

3. The method of plug welding dissimilar materials comprising the steps of:
(1) providing an aperture in a first member made from one of said materials,
   (1') said first member defining a peripheral edge around said aperture,
(2) placing a second member made from an easily weldable material in contact with said first member adjacent said aperture on the side opposite said peripheral edge,
   (2') said first and easily weldable materials being incompatible from the welding standpoint,
(3) placing a washer made from a material compatible from the welding standpoint with said easily weldable material around the aperture in said first member on the side opposite said second member,
(4) shielding said peripheral edge by extending a neck portion of said washer into said aperture beyond said peripheral edge,
(5) providing a hole in said neck portion of said washer,
   (5') said hole extending completely through said neck portion,
(6) inserting a compatible non-integral consumable electrode through said aperture and hole into contact with said second member
(7) providing a gas atmosphere in said hole to prevent combustion of air during welding,
(8) discharging a welding arc from said electrode,
(9) feeding said electrode through said hole while discharging said arc until
   (9') said portion is substantially consumed, and
   (9") said electrode and washer are fused into a plug weld filling said aperture and united to said second member, whereby the shielding of said peripheral edge by said neck portion prevents contamination of said weld caused by melting of said one material.

4. A joint between members composed of dissimilar materials comprising:
(a) a first joint member,
(b) a second joint member composed of easily weldable material,
(c) said first joint member being composed of material incompatible with said easily weldable material,
(d) an aperture through said first joint member defining a sharp corner,
(e) a washer composed of material compatible with said easily weldable material contacting said first joint member and surrounding said aperture, and
(f) a plug of fused material extending into said second joint member and filling said aperture,
   (f') said plug being fused to said second joint member and to said washer,
   (f") said plug comprising easily weldable material derived from a region of said second joint member adjacent said aperture and compatible material derived from a region of said washer in said aperture adjacent such sharp corner, and being substantially free of said incompatible material of said first joint member.

References Cited in the file of this patent
UNITED STATES PATENTS

| | | |
|---|---|---|
| 1,890,093 | Neff | Dec. 6, 1932 |
| 2,096,495 | Hogg | Oct. 19, 1937 |
| 2,191,632 | Smith | Feb. 27, 1940 |
| 2,563,107 | Fanger | Aug. 7, 1951 |
| 2,860,230 | Rapasky | Nov. 11, 1958 |